US006297491B1

(12) United States Patent
Mangerson (10) Patent No.: US 6,297,491 B1
(45) Date of Patent: *Oct. 2, 2001

(54) MEDIA SCANNER

(75) Inventor: Mark M. Mangerson, Le Mars, IA (US)

(73) Assignee: Gateway, Inc., N. Sioux City, SD (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/385,610

(22) Filed: Aug. 30, 1999

(51) Int. Cl.[7] .................................................. H04N 61/04
(52) U.S. Cl. ...................................... 250/208.1; 358/474
(58) Field of Search ........................ 250/208.1; 358/474, 358/475, 480, 481, 493, 494

(56) References Cited

U.S. PATENT DOCUMENTS

| D. 314,951 | 2/1991 | Swartz ................................ D14/107 |
| D. 351,152 | 10/1994 | Liu ...................................... D14/116 |
| D. 367,473 | 2/1996 | Tochishita et al. ................. D14/105 |
| D. 368,255 | 3/1996 | Sasaki et al. ....................... D14/107 |
| 4,641,357 | 2/1987 | Satoh ..................................... 382/61 |
| 4,731,668 | 3/1988 | Satomura et al. ................... 358/256 |
| 5,132,833 * | 7/1992 | Diau .................................... 359/221 |
| 5,278,673 | 1/1994 | Scapa et al. ........................ 358/473 |
| 5,289,262 | 2/1994 | McConnell .......................... 356/375 |
| 5,408,084 | 4/1995 | Brandorff et al. ................... 250/208 |
| 5,537,226 | 7/1996 | Wolberg et al. ..................... 358/486 |
| 5,574,804 | 11/1996 | Olschafskie et al. ............... 382/313 |
| 5,581,783 | 12/1996 | Ohashi ................................ 395/825 |
| 5,604,640 | 2/1997 | Zipf et al. ............................ 359/803 |
| 5,728,998 | 3/1998 | Novis et al. ......................... 235/380 |
| 5,748,338 | 5/1998 | Lee ...................................... 358/473 |
| 5,754,313 | 5/1998 | Pelchy et al. ....................... 358/473 |
| 5,763,862 | 6/1998 | Jachimowicz et al. ............. 235/380 |
| 5,786,582 | 7/1998 | Roustaei et al. .................... 235/462 |
| 5,825,502 | 10/1998 | Mayer ................................. 358/296 |
| 5,825,995 | 10/1998 | Wiklof et al. ....................... 395/117 |
| 5,847,405 | 12/1998 | Acquaviva et al. ............ 250/559.36 |
| 5,875,043 * | 2/1999 | Ito ....................................... 358/475 |

FOREIGN PATENT DOCUMENTS

| 0 582 547 A1 | 9/1992 | (EP) ............................. H04N/1/40 |
| 0 827 104 A2 | 4/1997 | (EP) ............................. G06K/11/18 |

* cited by examiner

Primary Examiner—Stephone B. Allen
(74) Attorney, Agent, or Firm—Suiter & Associates PC; Kenneth J. Cool (57) ABSTRACT

A media scanner scans information disposed on a media such as a business card or envelope. The media scanner requires no moving parts and may be incorporated in a portable, hand held, battery powered information handling system such as an electronic address book or personal digital assistant. The scanner includes a scanning element such as a linear CCD element for scanning the information stored on the medium, which is converted into a graphical image or text file. As the medium is fed past the scanning element, a detector detects the movement of the medium as the medium is fed through the scanner. Any variation of the movement of the medium, for example due to inconsistent movement or pausing caused by hand scanning, etc., is detected by detector, and scanning is executed according to the detected movement so that optimal scanning is maintained. The accommodation of the varying movement of the medium past the scanning element thereby minimizes or eliminates any errors or artifacts in the resulting scanned information (e.g., skewing) that would otherwise be caused by variable scanning movement. The detector may include an array of light detecting elements such as photodiodes or photo transistors, light detecting resistors, etc. such that light blocked from the array by the medium may be detected as a movement signal proportional to the movement of the medium. The detector may be utilized to determine the rate (relative scanning) or the position (absolute scanning) of the medium during scanning.

20 Claims, 6 Drawing Sheets

MEDIA SCANNER

FIELD OF THE INVENTION

The present invention generally relates to the field of information handling systems, and particularly to media scanners.

BACKGROUND OF THE INVENTION

In today's fast paced, high-technology business world, it is often desirable to be able to quickly obtain contact information for business associates encountered in the field whereby contact information is transferred between individuals. Traditionally, contact information such as name, business name, title, address and telephone number is printed on a smaller sized business card that is handed out to new contacts. However, the number of business cards that a person obtains may accumulate such that important business cards may be lost or misplaced. A paper based solution of this problem is to transcribe the information in a portable sized address book. A disadvantage of this solution, however, is the requirement that the information of each business card must be tediously transcribed by hand into the address book and which may result in transcription errors. With the advent of portable electronic computer devices that are battery powered, that are smaller sized and that provide ever greater information processing capabilities, the paper address book is being rapidly replaced by portable data assistant or portable digital assistance (PDA) devices that provide the functionality of the paper based address book while also providing other useful features (e.g., calendar, expense tracking, to do list, note pad, etc.). However, these powerful hand-held information handling systems still require the user to transcribe information received on a business card into the information handling system, a tedious and error prone task.

One solution to the transcription problem is to utilize an information reader or scanner to electronically obtain the information printed on a medium such as a standard business card. However, the moving scanning elements of traditional flatbed scanners are too large and too complex to be practical in a smaller sized, portable device. Scanning systems that are used in document feed type devices (e.g., fax machines) require some form of motorized, mechanical drive mechanism for feeding a document past a scanning element at a constant rate. However, a mechanical document feeding system is also to bulky and too impractical to implement in a hand-held portable device. Further, any mechanical system will require too much power to be practical in a smaller sized, battery powered device, and mechanical parts tend to wear out and are prone to failure. Additionally, motorized systems tend to consume too much power for a battery powered device. A linear scanning element could be contemplated in which the user feeds the document or information containing medium past the scanning element by hand. However, it is difficult for a human to provide a constant scanning rate so that skewing of the information due to a varying data input rate and other errors will inevitably occur. A two-dimensional type scanning element may be utilized to scan the entirety of the document at once, however two-dimensional scanning elements are too costly and require complex control software and focussing elements and are thus not a practical solution for fast, simple scanning of smaller sized documents such as business cards with a portable electronic address book device. Thus, there lies a need for a simple, electronic scanner for scanning information containing media and having no mechanical moving parts that is not prone to rate skewing and other problems associated with a manual feed scanner.

SUMMARY OF THE INVENTION

The present invention is directed to a media scanner for scanning information disposed on a medium. In one embodiment, the media scanner includes a scanning element capable of scanning information disposed on a medium when the medium is caused to move past said scanning element, and a detector capable of detecting the movement of the medium as the medium is caused to be moved past said scanning element wherein said scanning element scans the information according to the movement of said medium.

The invention is further directed to a method for scanning a medium. In one embodiment, the method includes steps for moving a medium on which information is disposed past a scanning element, detecting movement of the medium as the medium is moved past the scanning element, optimally scanning the information with the scanning element according to the detected movement of the medium, determining whether the detected movement of the medium changes during scanning, and in the event it is determined that the detected movement changes during scanning, adjusting the scanning step whereby the scanning step is executed optimally according to the detected movement of the medium.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWING

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
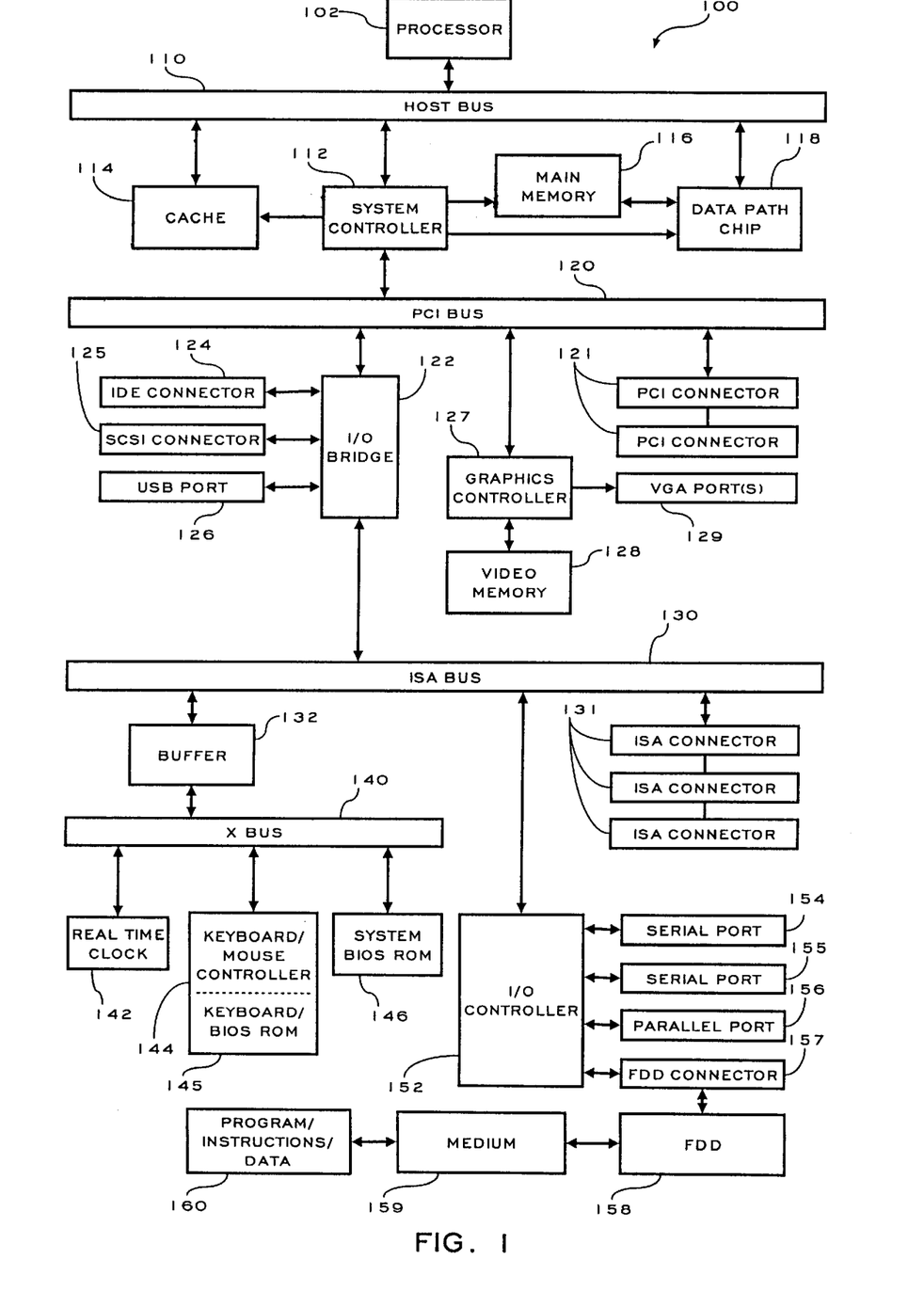
FIG. 1 is a block diagram of an information handling system operable to tangibly embody the present invention.

FIG. 1 shows a block diagram of an information handling system 100 in accordance with the present invention. In this embodiment, processor 102, system controller 112, cache 114, and data-path chip 118 are each coupled to host bus 110. Processor 102 is a microprocessor such as a 486-type chip, a Pentium®, Pentium II®, Pentium III®, or the like suitable microprocessor. Cache 114 provides high-speed local-memory data (in one embodiment, for example, 512 KB of data) for processor 102, and is controlled by system controller 112, which loads cache 114 with data that is expected to be used soon after the data is placed in cache 112 (i.e. in the near future). Main memory 116 is coupled between system controller 112 and data-path chip 118, and in one embodiment, provides random-access memory of between 16 MB and 128 MB of data. In one embodiment, main memory 116 is provided on SIMMs (Single In-line Memory Modules), while in another embodiment, main memory 116 is provided on DIMMs (Dual In-line Memory Modules), each of which plugs into suitable sockets provided on a motherboard holding these components and many of the other components shown in FIG. 1. Main memory 116 includes standard DRAM (Dynamic Random-Access Memory), EDO (Extended Data Out) DRAM, SDRAM (Synchronous DRAM), or the like suitable memory technology. System controller 112 controls PCI (Peripheral Component Interconnect) bus 120, a local bus for system 100 that provides a high-speed data path between processor 102 and various peripheral devices, such as video, disk, network, etc. Data-path chip 118 is also controlled by system controller 112 to assist in routing data between main memory 116, host bus 110, and PCI bus 120.

In one embodiment, PCI bus 120 provides a 32-bit-wide data path that runs at 33 MHz. In another embodiment, PCI bus 120 provides a 64-bit-wide data path that runs at 33 MHz. In yet other embodiments, PCI bus 120 provides 32-bit-wide or 64-bit-wide data paths that run at higher speeds. In one embodiment, PCI bus 120 provides connectivity to I/O bridge 122, graphics controller 127, and one or more PCI connectors 121, each of which accepts a standard PCI card. In one embodiment, I/O bridge 122 and graphics controller 127 are each integrated on the motherboard along with system controller 112, in order to avoid a board-to-connector-to-board signal crossing interface and thus provide better speed and reliability. In the embodiment shown, graphics controller 127 is coupled to a video memory 128 that includes memory such as DRAM, EDO DRAM, SDRAM, or VRAM (Video Random-Access Memory), and drives VGA (Video Graphics Adapter) port 129. VGA port 129 can connect to VGA-type or SVGA (Super VGA)-type displays or the like. Other input/output (I/O) cards having a PCI interface can be plugged into PCI connectors 121.

In one embodiment, I/O bridge 122 is a chip that provides connection and control to one or more independent IDE connectors 124–125, to a USB (Universal Serial Bus) port 126, and to ISA (Industry Standard Architecture) bus 130. In this embodiment, IDE connector 124 provides connectivity for up to two or more standard IDE-type devices such as hard disk drives, CD-ROM (Compact Disk-Read-Only Memory) drives, DVD (Digital Video Disk or Digital Versatile Disk) drives, or TBU (Tape-Backup Unit) devices. In one similar embodiment, two IDE connectors 124 are provided, and each provide the EIDE (Enhanced IDE) architecture. In the embodiment shown, SCSI (Small Computer System Interface) connector 125 provides connectivity for preferably up to seven or fifteen SCSI-type devices (depending on the version of SCSI supported by the embodiment). In one embodiment, I/O bridge 122 provides ISA bus 130 having one or more ISA connectors 131 (in one embodiment, three connectors are provided). In one embodiment, ISA bus 130 is coupled to I/O controller 152, which in turn provides connections to two serial ports 154 and 155, parallel port 156, and FDD (Floppy-Disk Drive) connector 157. In one embodiment, FDD connector 157 is connected to FDD 158 that receives removable media (floppy diskette) 159 on which is stored data and/or program code 160. In one such embodiment, program code 160 includes code that controls programmable system 100 to perform the method described below. In another such embodiment, serial port 154 is connectable to a computer network such as the internet, and such network has program code 160 that controls programmable system 100 to perform the method described below. In one embodiment, ISA bus 130 is connected to buffer 132, which is connected to X bus 140, which provides connections to real-time clock 142, keyboard/mouse controller 144 and keyboard BIOS ROM (Basic Input/Output System Read-Only Memory) 145, and to system BIOS ROM 146.

FIG. 1 shows one exemplary embodiment of the present invention, however other bus structures and memory arrangements are specifically contemplated. In one embodiment, I/O bridge 122 is a chip that provides connection and control to one or more independent IDE connectors 124–125, to a USB (Universal Serial Bus) port 126, and to ISA (Industry Standard Architecture) bus 130. In this embodiment, IDE connector 124 provides connectivity for up to two standard IDE-type devices such as hard disk drives or CD-ROM (Compact Disk-Read-Only Memory) drives, and similarly IDE connector 125 provides connectivity for up to two IDE-type devices. In one such embodiment, IDE connectors 124 and 125 each provide the EIDE (Enhanced IDE) architecture. In one embodiment, I/O bridge 122 provides ISA bus 130 having one or more ISA connectors 131 (in one embodiment, three connectors are provided). In one embodiment, ISA bus 130 is coupled to I/O controller 152, which in turn provides connections to two serial ports 154 and 155, parallel port 156, and FDD (Floppy-Disk Drive) connector 157. In one embodiment, ISA bus 130 is connected to buffer 132, which is connected to X bus 140, which provides connections to real-time clock 142, keyboard/mouse controller 144 and keyboard BIOS ROM (Basic Input/Output System Read-Only Memory) 145, and to system BIOS ROM 146. It should be appreciated that modification or reconfiguration of information handling system 100 of FIG. 1 by one having ordinary skill in the art would not depart from the scope or the spirit of the present invention.

Figure 2:
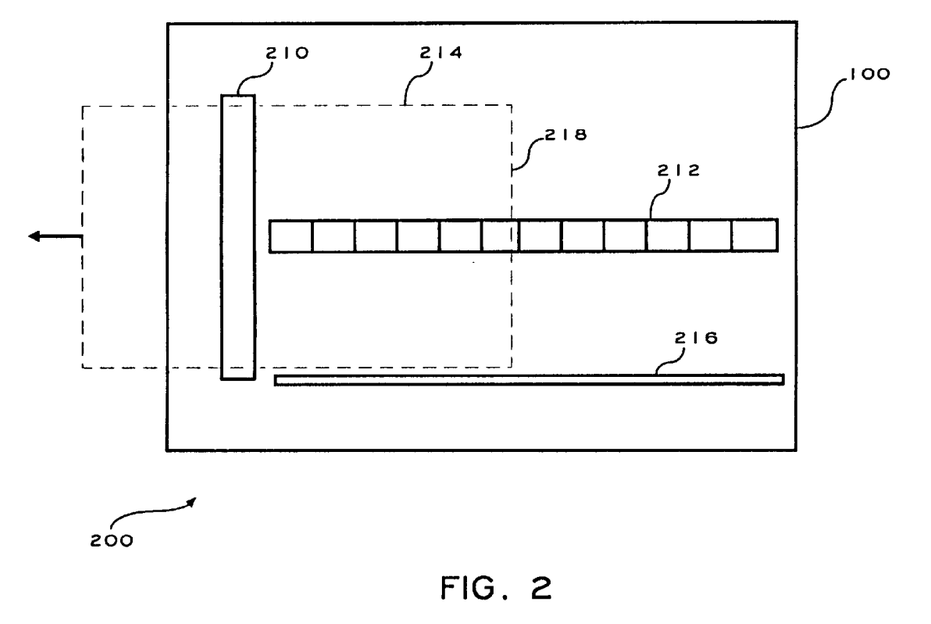
FIG. 2 is a top plan view schematic diagram of a media scanner in accordance with the present invention.

Referring now to FIG. 2, a top plan view schematic diagram of a media scanner in accordance with the present invention will be discussed. In a preferred embodiment, the media scanner 200 is integrated within a portable information handling system 100 that may be battery powered and of a size and shape to be carried and operated in a hand of a user. However, media scanner 210 may be utilized in conjunction with any suitable information handling system, alone or in combination therewith, and need not be limited to a portable, battery powered device. A medium 214 containing information printed or written thereon may be passed through media scanner 200 by causing medium 214 to move along in a direction as indicated by the arrow. Medium 214 may be any type of medium having optically readable information disposed thereon such as a business card, envelope, etc. A guide 216 may be utilized so that medium may be guided along a prescribed path when passed through media scanner 200 so that medium 214 is juxtaposed in a proper alignment and orientation with respect to scanning element 210. Scanning element 210 optically scans the information printed on medium 214 as medium 214 passes by scanning element 210. In a preferred embodiment, scanning element 210 is a linear charge-coupled device (CCD) array that is capable of optically scanning the information contained on medium 214 into a memory of information handling system 100. Although scanning element 210 is preferably a linear CCD array, any suitable scanning element or device having properties similar to a CCD array may be utilized (e.g., laser diode scanner, spatial light modulator, etc.). As medium 214 is passed through media scanner 200 for scanning information contained thereon, media 214 passes over rate detector 212 for determining the rate at which media 214 is passed through media scanner 200 and by scanning element 214. In a preferred embodiment, rate detector 212 is capable of instantaneously determining the rate at which medium 214 is passed by scanning element 210 such that the electronic scanning rate at which information disposed on medium 214 is scanned may be dynamically adjusted to accommodate the movement rate of medium 214. Thus, for example, if the movement rate of medium 214 past scanning element 210 is increased during the scanning process, rate detector 212 detects the rate increase and sends a signal to information handling system 100 indicative of the increased rate, and the scanning rate is increased in response thereto. Conversely, if the movement of medium 214 past scanning element 210 is decreased during the scanning process, rate detector 212 detects the rate decrease and sends a signal to information handling system 100 indicative of the decreased rate, and the scanning rate is decreased in response thereto.

Figure 3:
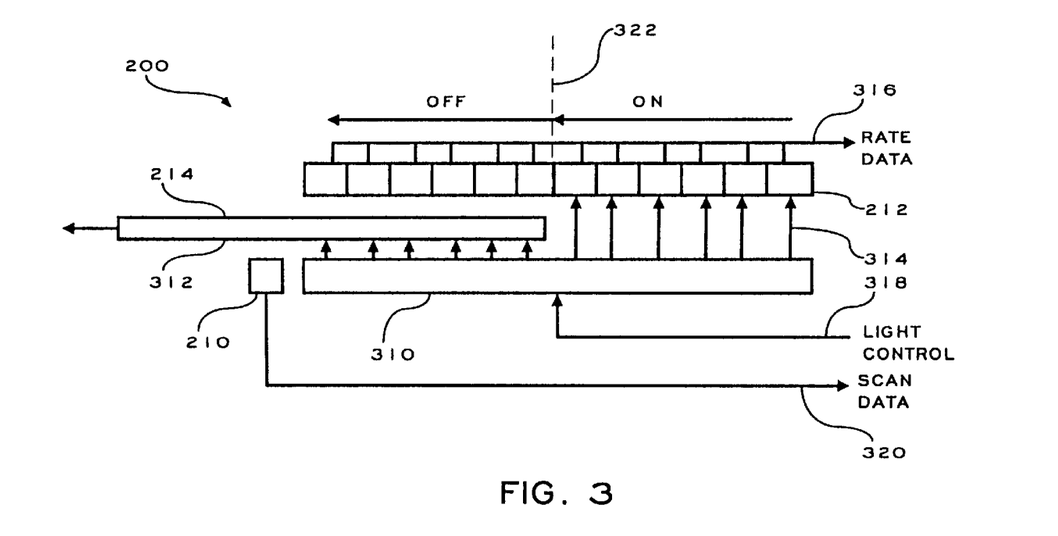
FIG. 3 is an elevation view schematic diagram of the media scanner of FIG. 3.

Referring now to FIG. 3, an elevation view schematic diagram of the media scanner of FIG. 3 will be discussed. As medium 214 is passed through media scanner 200, medium 214 passes by scanning element 210 such that information disposed on a surface 312 of medium 314 is optically detected by scanning element 210 and sent to information handling system 100 as a signal containing scan data 320. Information handling system 100 is thereby able to save the information in a memory (e.g., main memory 116) or on an information storage medium (e.g., medium 159) as an optical or image file (e.g., graphical image file), or to decode the information and save the image is a text file, for example using optical character reader (OCR) software. Since the rate at which medium 214 moves past scanning element 210 may vary over time during the scanning process, for example due to non-constant movement of the user's hand when the user manually passes medium 214 through media scanner 200, information handling system 100 varies the rate at which scanning element 210 scans the information disposed on medium 214. The rate at which medium 214 passes by scanning element 210 is detected with rate detector 212. In a preferred embodiment, rate detector 212 comprises an array of light detecting or photosensitive elements. For example, each of the light detecting elements of rate detector 212 may comprise a photosensitive semiconductor device such as a photosensitive diode or transistor whereby the light detecting element produces a "HIGH" or "ON" signal when light impinges thereon, and produces a "LOW" or "OFF" signal in the absence of a sufficient level of impinging light . Alternatively, each of the light detecting elements of rate detector 212 may comprise any suitable device for detecting the presence or absence of light. For example, each of the light detecting elements may comprise a light detecting resistor wherein the resistance of the device varies with the amount of light impinging thereon such that an "OFF" signal may be produced when the level of light is less than a predetermined level, and an "ON" signal may be produced when the level of light is greater than a predetermined level. In one embodiment of the invention, a light source 310 is utilized to provide a predetermined level of light to rate detector 212 for operably detecting the movement rate of medium 214. Light source 310 may be turned on or off by a light control signal 318 provided by information handling system 100 to light source 310.

As medium 214 is passed through media scanner 200, medium 214 will be transiently interposed between rate detector 212 and light source 310. When medium 214 is interposed between rate detector 212 and light source 310, light 314 emanating from light source 310 is blocked from impinging upon the elements of rate detector 212 by medium 214. Thus, when light is blocked by medium 214 from impinging upon a light detecting element, that particular element provides an "OFF" signal. As the trailing edge 218 of medium 214 passes by the elements of rate detector 212, the elements over which trailing edge 218 has passed become unblocked by medium 214 so that light 314 emanating from lighting element 310 may impinge upon those elements and thereby produce an "ON" signal. Thus, during the course of scanning as medium 214 passes through media scanner 200, the instantaneous position of medium 214 in media scanner 200 may be known since trailing edge 218 of medium 214 corresponds to the position along rate scanner 200 where there is a transition point 322 from an "OFF" element to an "ON" element. Furthermore, since "OFF-ON" transition point 322 moves along rate detector 212 at a rate proportional to the movement rate of medium 214 through media scanner 200, rate detector 212 provides a signal that contains rate data 316 to information handling system 100. Information handling system 100 receives movement rate data 316 from rate detector 212 and thereby controls the scanning rate of scanning element 210 in accordance with the detected movement rate of medium 214. In a preferred embodiment of the invention, the length of rate detector 212 is at least as long as the length of medium 214 to be scanned, or longer, so that the instantaneous rate of movement of medium 214 through media scanner 200 may be detected for the entire duration that information disposed on medium 214 is scanned with scanning element 210.

Figure 4:
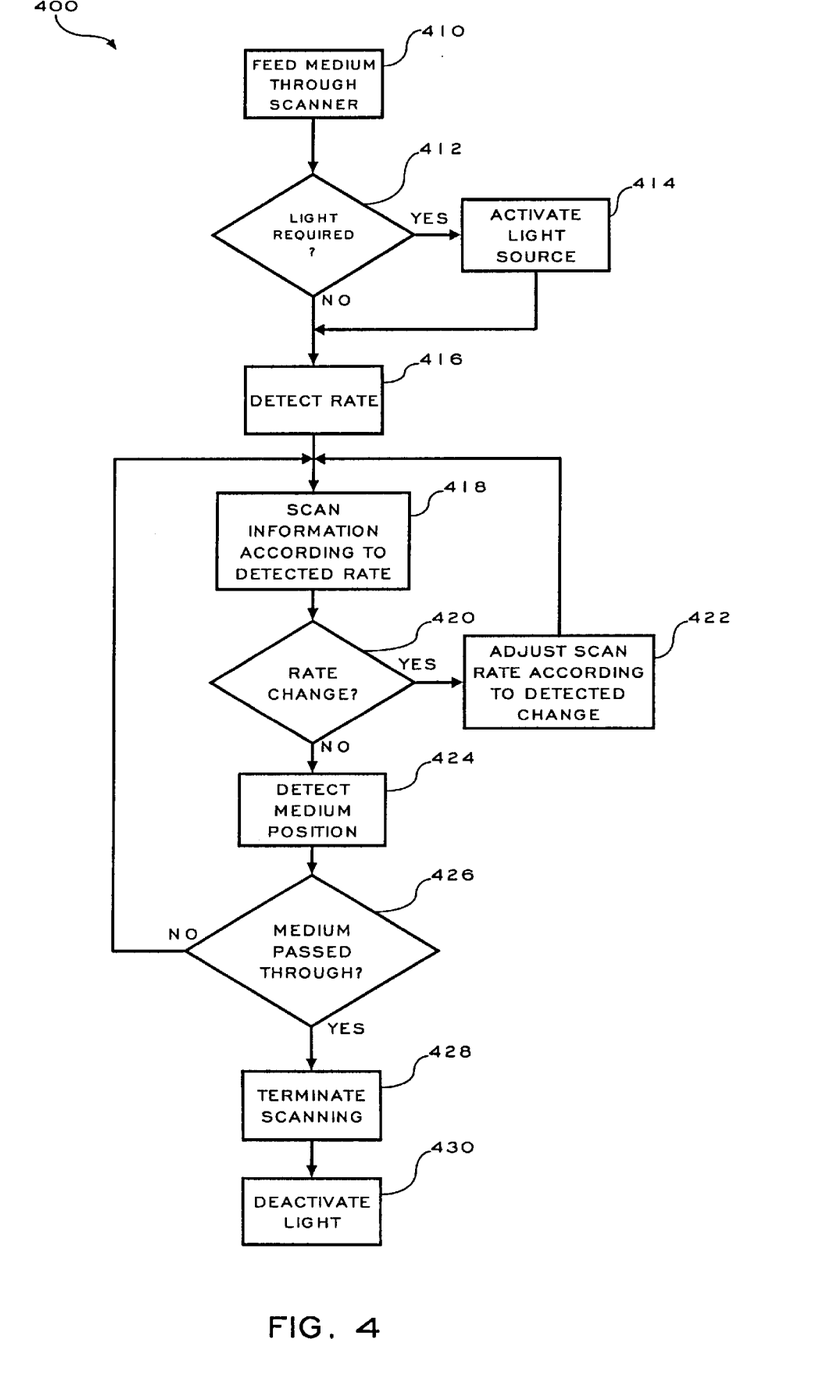
FIG. 4 is a flow diagram of a method for scanning a medium having information disposed thereon in accordance with the present invention.

Referring now to FIG. 4, a flow diagram of a method for scanning a medium having information disposed thereon in accordance with the present invention will be discussed. Method 400 may be implemented as a program of instructions executed by processor 102 of information handling system 100 that is stored in a memory such as main memory 116 or on an information storage medium such as medium 159. Method 400 initiates with the feeding of medium 214 through media scanner 200 at step 410. A determination is made at step 412 whether light is required so that rate detector 212 has a sufficient level of light to properly detect the rate of movement of medium 214 through media scanner 200. In the event it is determined that light is required, light source 310 is activated at step 414. As medium 214 passes through media scanner 200, the rate of movement of medium 214 is detected by rate detector 212 at step 416. Information disposed on medium 214 is scanned at step 418 according the detected rate of movement of medium 214 such that the scanning rate is optimized. A determination is made at step 420 whether rate detector 212 detects any change in the rate of movement of medium 214 though media scanner 200. In the event that a change in the movement rate of medium 214 is detected by rate detector 212, information handling system 100 adjusts the rate at which scanning element 210 scans information disposed on medium 214 according to the detected rate change so that the optimal scanning rate is maintained, and any detrimental scanning effects or artifacts (e.g., skewing) due to a varying rate of movement of medium 214 are minimized or eliminated altogether. The position of medium 214 in media scanner 200 is determined from rate detector data 316 by information handling system at step 424 such that a determination may be made at step 426 whether medium 214 has completely passed through media scanner 200. For example, information handling system 100 may determine that the trailing edge 218 of medium 214 has passed the end of rate detector 212 in the event the "OFF-ON" transition point 322 of the light detecting elements of rate detector 212 has reached an end of the rate detector and all of the elements are producing an "ON" signal. If medium 214 is not yet determined to have passed through media scanner 200, method 400 may continue with step 418 such that information disposed on medium 214 is continued to be scanned. In the event it is determined that medium 214 has passed through media scanner 200, scanning may be terminated at step 428. In addition, if light source 310 had been previously activated at step 414, light source 310 is deactivated at step 430.

Figure 5:
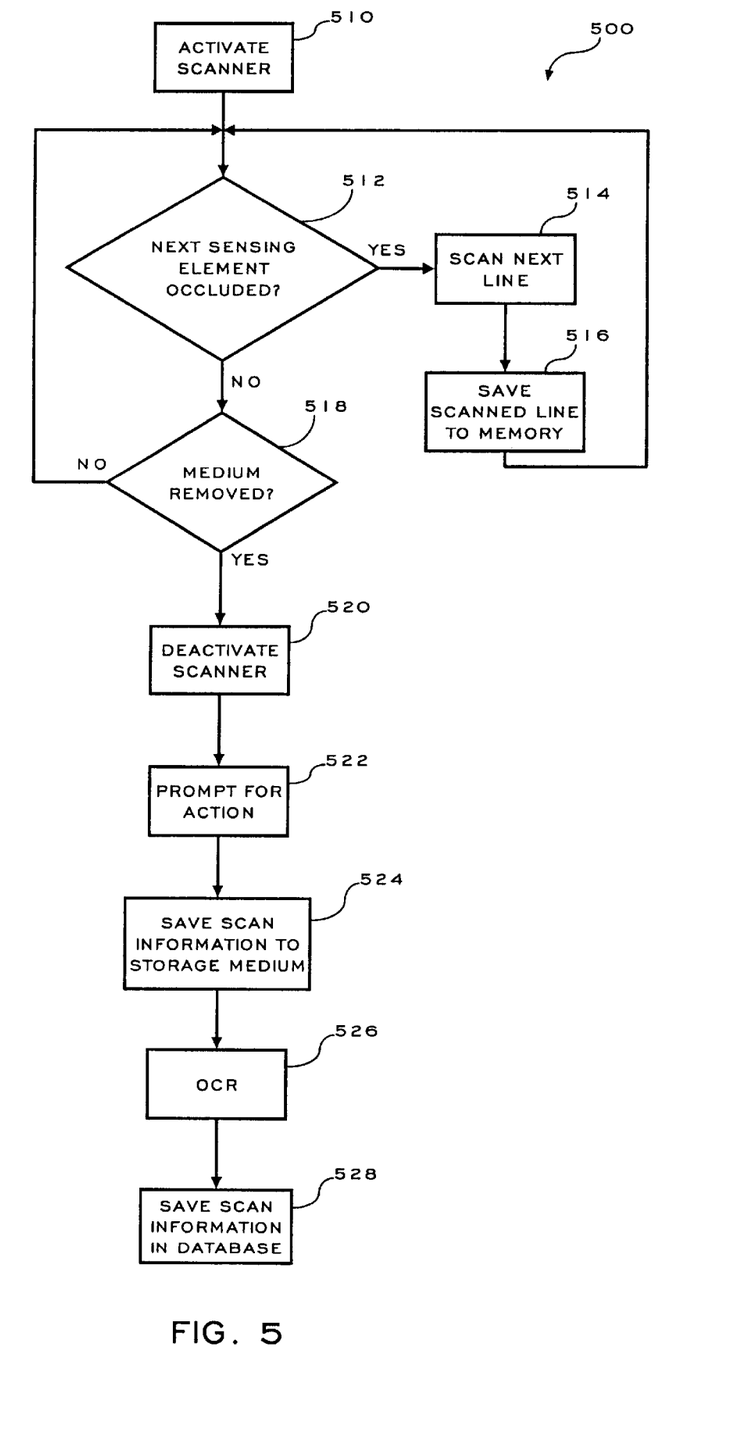
FIG. 5 is a flow diagram of a method for scanning information stored on a medium in accordance with the present invention.

Referring now to FIG. 5, a flow diagram of a method for scanning information stored on a medium in accordance with the present invention will be discussed. The scanning method discussed with respect to FIG. 4 may be considered to be a relative scanning method in which the rate at which scanning element 210 is activated is set to be proportional to the rate at which medium 214 is detected to be passed through media scanner 200, i.e., the scanning rate is adjusted relative to the rate of movement of medium 214 through scanner. In an alternative embodiment as shown in FIG. 5, information handling system 100 may be configured to implement an absolute scanning method in which scanning element 210 is activated to perform a scan at each detected change in position of medium 214 over successive elements of detector 212. Thus, in such an embodiment, rate detector 212 is configured to function as an absolute position detector rather than as a rate detector by detecting the position of medium 214 in scanner 200. Each time at least one or more elements of detector 212 is occluded, a scan event occurs by sampling the output of scanning element 210, and the output may be appropriately acted upon (e.g., stored to memory). In such an embodiment, scanning method 500 does not rely upon the rate at which medium 214 is passed through scanner 200. For example, if a user momentarily pauses during scanning, elements of scanning element 210 will not be occluded during the pause, and scanning element 210 is not sampled. Even if the user transiently moves medium 214 in a reverse direction, a scan event will not occur. In one embodiment, information handling system 100 is capable of detecting which elements of scanning element 210 have previously been occluded; in the event those elements are occluded again during scanning, information handling system 100 will either disregard any inadvertent scans caused by occlusion of previously occluded elements, or will not activate scanning element 210 in the event previously occluded elements are reoccluded. When the next element that has not been previously occluded is occluded for the first time, scanning element 210 is activated to scan medium 214. Furthermore, as medium 214 is caused to be removed from scanner 200, either by passing completely through a unidirectionally capable scanning system, or when passing back out of scanner 200 in a bidirectionally capable scanning system, rate detector 212 is capable of detecting the absolute position of medium 214 and thus is capable of detecting when medium 214 has been removed from scanner 200. In such an event, information handling system 100 is capable of detecting that scanning of medium 214 has been completed or aborted.

As shown in FIG. 5, scanner 200 is activated at step 510. A determination is made at step 512 whether a succeeding element of detector 212 (configured as a position detector) is occluded. In the event a succeeding element is occluded, a succeeding pixel or line of medium 214 is scanned at step 514, and the scanned information is saved to memory at step 516. In the event a succeeding element is not occluded, the succeeding pixel or line of medium 214 is not scanned, and a determination is made whether medium 214 has been removed from scanner 200. In the event it is not determined that medium 214 has been removed, method 500 continues at step 512. In the event that it is determined that medium 214 has been removed from scanner 518, the scanning process has been completed or has been aborted, and scanner 200 is deactivated at step 520. A prompt for action is provided at step 522 (i.e., a user or software is queried for the next action to occur), and based upon the result of the prompt, any one or more of the following steps may be executed. The scan information is saved to an information storage medium at step 524, optical character recognition is performed on the scan information at step 525, and the scan information is saved in a database for later retrieval. Further steps may also be executed by information handling system 100 on the scan information if so configured. For example, the resulting scan information may be displayed on a display of information handling system 100 as a graphical or image file such that an operator may review the scan information to determine whether scanning was successful, etc.

Figure 6:
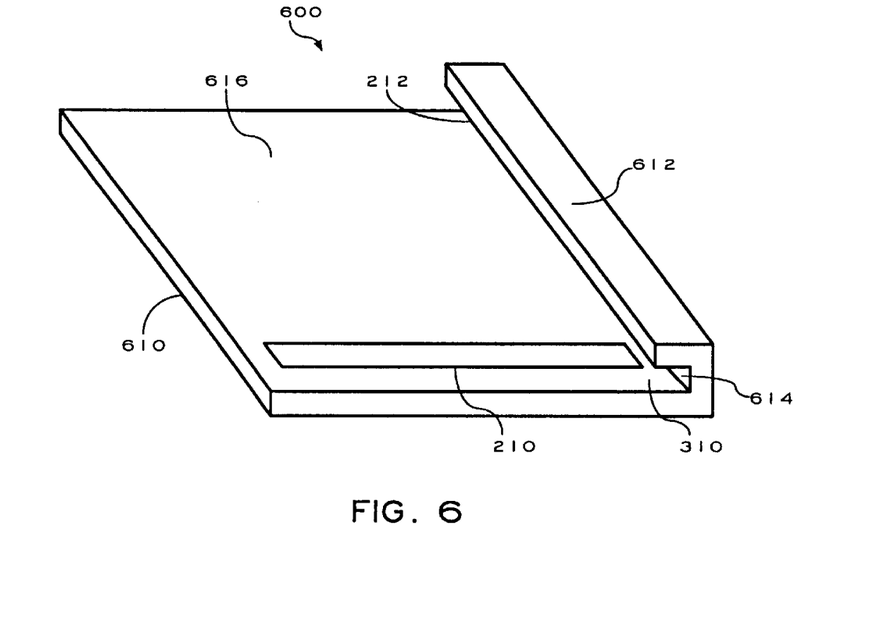
FIG. 6 is a diagram of an alternative embodiment of the media scanner of the present invention.

Referring now to FIG. 6, an alternative embodiment of the media scanner of the present invention will be discussed. Scanner 600 as shown in FIG. 6 is particularly suitable for scanning larger sized media, for example letter or A4 sized paper, however the embodiment of FIG. 6 need not be limited to any specific sized medium or media. Scanner 600 includes a bed 610 upon which a medium may be laid and a lip 612 formed on a side of bed that is disposed at a predetermined distance above bed 610. The inside region of bed 610 that supports lip 612 may be a guide region for aiding the positioning of a medium on bed 616 and for guiding the movement of the medium as it is scanned. Scanning element 210 is preferably disposed at an end of bed 616 on an upper surface 616 thereof. Detector (rate or position) 212 is disposed underneath lip 612 and is disposed opposite light source 310 for rate and/or position sensing of medium 214 as described with respect to FIGS. 2 and 3.

Figure 7:
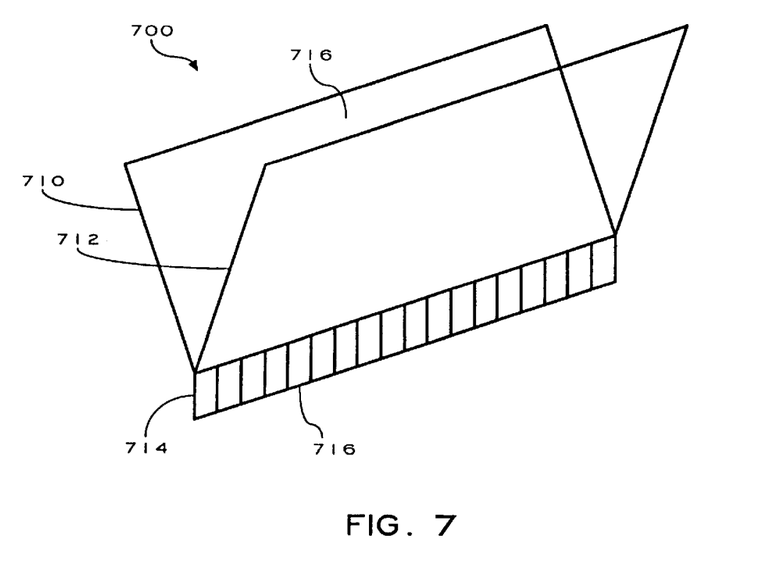
FIG. 7 is diagram of a scanning caddy for facilitating the scanning of a medium in association with the media scanner of the present invention.

Referring now to FIG. 7, a scanning caddy for facilitating the scanning of a medium in association with the media scanner of the present invention will be discussed. In order to accommodate media of varying dimensions (e.g., length, width, etc.), scanning caddy 700 may be utilized. Scanning caddy comprises first and second sheaths 710 and 712 that are preferably light transmissive (i.e., clear) so that light may pass through at least one of sheaths 710 and 712. A medium to be scan is inserted into region 716 in between sheaths 710 and 712. Sheaths 710 and 712 may be, for example, clear plastic panes hingeably attached along a common edge thereof so that sheaths 710 and 712 may be opened apart to allow the insertion of a medium into region 712 and then closed together. An array of scanning indicia 716 is disposed along an edge of scanning caddy for facilitating the detection of the movement of scanning caddy 700 through a media scanner such as scanner 600. The size of scanning caddy 700 is such that, regardless of the medium inserted into region 712 of scanning caddy, detector 212 will be properly and optimally actuated for scanning a medium. For example, the size of scanning caddy 700 may be on the order of a sheet of letter or A4 sized paper designed to be utilized with scanner 600. In the event a user desires to scan a smaller sized medium such as a standard business card, the business card may be inserted into scanning caddy 700 to be properly scanned with scanner 600. Thus, scanning caddy 700 may be utilized to ensure proper and complete scanning with various sized media. Scanning indicia may be at least one or more windows that intermittently allow light to pass therethrough as scanning caddy 700 is caused to be moved through the scanner (e.g., scanner 600), thereby intermittently activating one or more elements of detector 212. In an alternative embodiment, scanning indicia may be regions of higher and lower reflectivity (e.g., light and dark) similar to a standard bar code array such that detector 212 is capable of detecting the varying intensity of light reflected from scanning indicia 716 as scanning caddy 700 is moved through the scanner. In such an embodiment, light source 310 may be disposed adjacent to or proximal to detector such that light emanating from light source 310 may be reflected off of scanning indicia 716 and onto detector 212. In a further alternative embodiment, scanning indicia 716 may comprise a strip of a magnetic medium having regions of varying magnetic flux density for indicating the position and movement of scanning caddy 700 as it is passed through the scanner. In this embodiment, detector 212 may comprise at least one or more pick up heads or inductors that are capable of detecting the varying magnetic flux densities disposed on scanning indicia 716 and convert the varying magnetic flux densities into an electrical signal interpretable by information handling system as being representative of the position and movement of scanning caddy 700 through the scanner. Other various scanning indicia 716 and detector 212 systems may be contemplated that achieve the same result as those systems indicated herein without departing from the scope of the invention.

Figure 8:
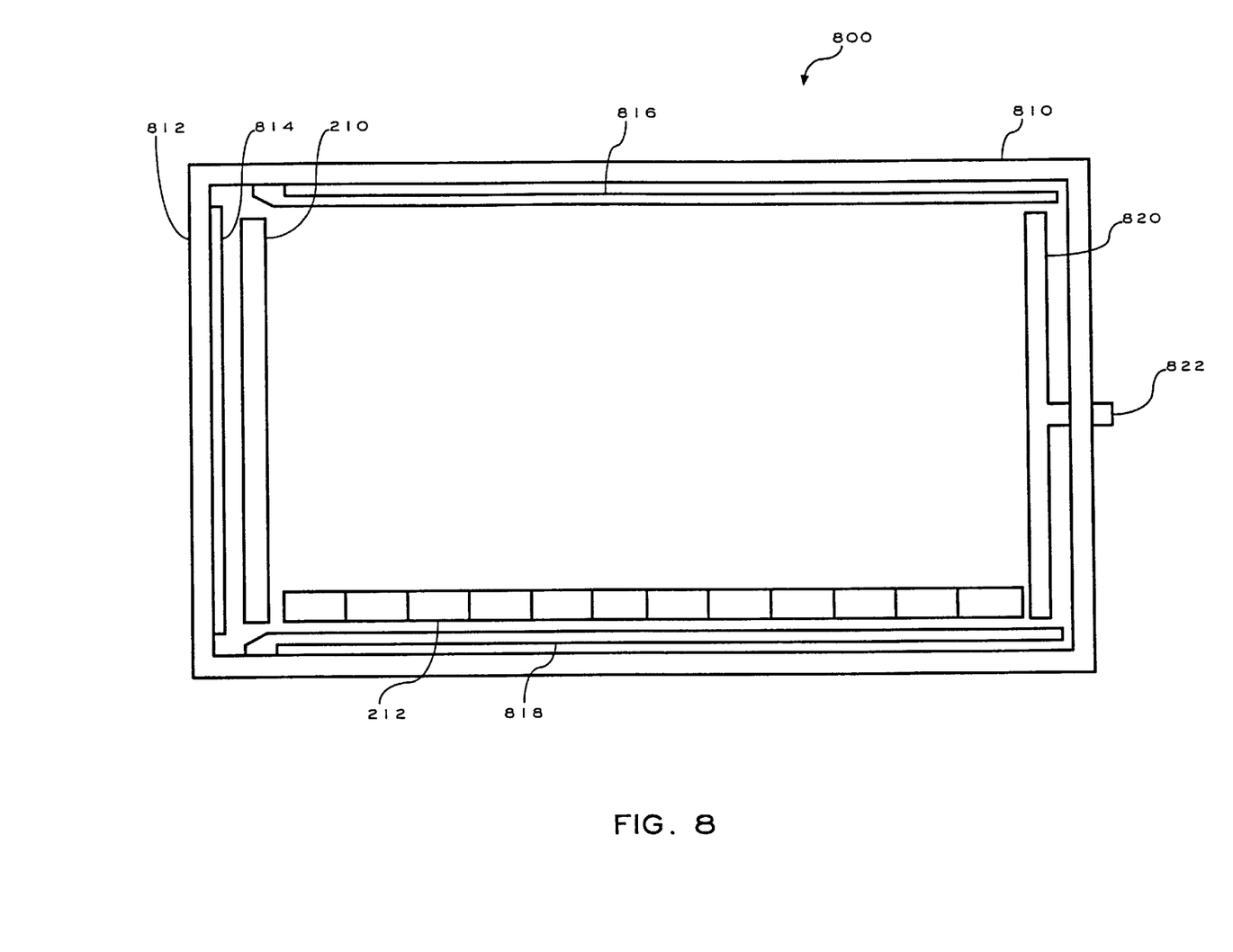
FIG. 8 is a diagram of a further embodiment of a media scanner in accordance with the present invention.

Referring now to FIG. 8, a further embodiment of a media scanner in accordance with the present invention will be discussed. Scanner 800 may be integrated in a housing of an information handling system in which access to a medium inserted into scanner 800 may be limited by the housing itself. Scanner 810 includes a housing 810 that may be itself a part of a housing of an information handling system 100. A medium is inserted edgewise into a slot 812 disposed at an end of housing 812. One or more rollers 814 may be disposed in slot 814 for facilitating the insertion and removal of a medium through slot 812 and into and out of housing 812. Alternatively, one or more rollers 814 may be one or more slides that are a fixed part of housing 810 and allow a medium to slidably pass against the slides and guide the movement of medium in a manner similar to rollers, however without requiring any moving parts. To further guide and position a medium as it is inserted into or removed out of housing 812, at least one or more guides 816 and 814 may be disposed in the interior of housing 810. Guides 816 and 818 may be rigidly disposed, or alternatively may be flexibly disposed so as to provide a spring bias against the medium when inserted into housing 810 to further enhance the positioning and guiding of the medium. For example, housing 810 may be fabricated from a plastic material and at least one of guides 816 and 818 may also be fabricated from a plastic material and may be an integral extension of housing 810. As such, at least one of guides 816 or 818 may form a cantilevered extension from housing 810 such that a bias force is applied against a medium when inserted into housing due to the plastic material from which guides 816 and 818 are fabricated. An ejector 820 may be included in housing 810 for causing a medium inserted into housing 810 to be easily ejected therefrom. Ejector 822 may include a lever that extends from housing 810 such that a user may easily operate ejector 820. In operation, a user inserts a medium to be scanned into housing 810 via slot 812. A user may then remove medium from housing 810 by actuating ejector 820 to at least partially or wholly eject the medium from housing 810. The medium may be scanned at least in part or completely as it is inserted into housing, scanned at least in part or completely as it is removed from housing 810, or a combination thereof. Housing 810 includes scanning element 210, detector 212, and, if required, light source 210 (not shown) disposed opposite detector 212 for performing scanning operations.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 116 of one or more computer information handling systems configured generally as described in FIG. 1. Until required by the computer system, the set of instructions may be stored in another computer readable memory such as information storage medium 159 of FIG. 1, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet (a program executed from within another application) or a servlet (an applet executed by a server) that is interpreted or compiled after transmission to the computer system rather than prior to transmission. One skilled in the art would appreciate that the physical storage of the sets of instructions, applets or servlets physically changes the medium upon which it is stored electrically, magnetically, chemically, physically, optically or holographically so that the medium carries computer readable information.

It is believed that the media scanner of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A media scanner, comprising:
   scanning element capable of scanning information disposed on a medium when the medium is caused to move past said scanning element; and
   a detector capable of detecting the movement of the medium as the medium is caused to be moved past said scanning element wherein said scanning element scans the information according to the movement of said medium.

2. A media scanner as claimed in claim 1, said scanning element comprising a linear CCD array.

3. A media scanner as claimed in claim 1, said detector comprising an array of light detecting elements.

4. A media scanner as claimed in claim 1, said detector having a length being greater than a length of the medium such that the movement of the medium may be detected during an entire scan of the information disposed on the medium.

5. A media scanner as claimed in claim 1, further comprising a light source disposed proximal to said detector such that the medium at least partially prevents light emanating from said light source from impinging upon said detector.

6. A media scanner as claimed in claim 1, further comprising a guide for guiding the medium along a prescribed path such that the medium may be optimally disposed with respect to said scanning element during scanning.

7. A media scanner, comprising:

means for scanning information disposed on a medium when the medium is caused to move past a scanning element;

means for detecting movement of the medium as the medium is caused to be moved past said scanning element wherein said scanning element scans the information according to the movement of said medium; and means for controlling the scanning of said scanning means in response to the detected movement of the medium such that scanning of the information disposed on the medium is optimized.

8. A media scanner as claimed in claim 7, further comprising means for illuminating said detecting means wherein said detecting means is variably illuminated as the medium passes between said detecting means and said illuminating means such that the movement of the medium during scanning is provided to said scanning means.

9. A media scanner as claimed in claim 7, said detecting means comprising an array of means for detecting light, each of said light detecting means providing a signal corresponding to an amount of light impinging thereupon.

10. A media scanner as claimed in claim 7, further comprising means for guiding the medium along a prescribed path during scanning such that the medium is optimally disposed with respect to said scanning means.

11. A media scanner as claimed in claim 7, further comprising means for storing the information scanned from the medium in an image format.

12. A media scanner as claimed in claim 7, further comprising means for storing the information scanned from the medium in a text format.

13. A method for scanning a medium, comprising:

moving a medium on which information is disposed past a scanning element;

detecting movement of the medium as the medium is moved past the scanning element;

optimally scanning the information with the scanning element according to the detected movement of the medium;

determining whether the detected movement of the medium changes during scanning; and in the event it is determined that the detected movement changes during scanning, adjusting said scanning step whereby said scanning step is executed optimally according to the detected movement of the medium.

14. A method as claimed in claim 13, further comprising the steps of determining whether lighting is required during scanning to optimally execute said movement detecting step, and, in the event it is determined that lighting is required, activating a light source for augmenting said movement detecting step.

15. A method as claimed in claim 13, further comprising the steps of detecting the position of the medium during scanning, determining whether the information disposed on the medium has been completely scanned, and, in the event it is determined that the information has been completely scanned, terminating said scanning step.

16. A method as claimed in claim 13, further comprising the steps of detecting the position of the medium during scanning, determining whether the information disposed on the medium has been completely scanned, and, in the event it is determined that the information has been completely scanned, deactivating a light source that had been previously illuminated.

17. A program of instructions executable by an information handling system and storable on a computer readable medium for causing an information handling system to execute steps for scanning an medium, the steps comprising:

scanning information disposed on a medium as the medium is caused to move past a scanning element;

detecting the movement of the medium as the medium is caused to move past the scanning element; and optimally adjusting the scanning of the information according to the detected movement of the medium as the medium is caused to move past the scanning element.

18. A program of instructions as claimed in claim 17, the steps further comprising the steps of detecting a change in the movement of the medium as the medium is caused to move past the scanning element, and executing said adjusting step by optimally scanning the medium according to the detected change in movement of the medium.

19. A program of instructions as claimed in claim 17, the steps further comprising the steps of detecting the position of the medium with respect to the scanning element during scanning, determining whether the medium has completely passed by the scanning element, and in the even the medium has completely passed by the scanning element, terminating said scanning step.

20. A program of instructions as claimed in claim 17, further comprising the steps of determining whether illumination is required to optimally execute said rate detecting step, and, in the event it is determined that illumination is required, providing illumination to augment execution of said rate detecting step.

* * * * *